United States Patent

Dittmar

[15] 3,642,346

[45] Feb. 15, 1972

[54] PICTORIAL PARALLAX PANORAMAGRAM INCLUDING A CELLULOSE ESTER HOT MELT THERMOPLASTIC VIEWING SCREEN

[72] Inventor: John H. Dittmar, Masonville, N.J.

[73] Assignee: Eastman Kodak Company, Rochester, N.Y.

[22] Filed: Aug. 8, 1969

[21] Appl. No.: 848,728

[52] U.S. Cl. .............................. 350/131, 106/193 D, 117/10, 117/11, 117/15, 117/73, 117/76 P, 117/86, 117/90, 156/332, 260/22 R

[51] Int. Cl. .................... B44c 1/20, B44d 1/16, G02b 27/22

[58] Field of Search .................. 117/86, 90, 73, 76 P, 10, 11, 117/76 R, 15; 350/131, 167; 106/193 D; 260/22; 156/332

[56] References Cited

UNITED STATES PATENTS

| | | | |
|---|---|---|---|
| 2,140,702 | 12/1938 | Kanolt | .................................. 350/131 |
| 2,361,347 | 10/1944 | Brown | .................................. 350/131 |
| 2,681,338 | 6/1954 | Harrison et al. | .................... 106/193 X |
| 2,782,127 | 2/1957 | Walker et al. | ....................... 106/193 X |
| 3,110,608 | 11/1963 | Brunson et al. | ........................... 117/10 |
| 3,148,059 | 9/1964 | Brunson et al. | .................. 350/167 UX |
| 3,250,173 | 5/1966 | Henry | .................................. 350/131 |
| 3,264,164 | 8/1966 | Jerothe et al. | .................... 350/167 UX |
| 3,441,434 | 4/1969 | Jezl | ........................................ 117/90 X |
| 3,494,882 | 2/1970 | Andrews | .................................. 260/22 |

OTHER PUBLICATIONS

Tall Oil And Its Uses, Information Training Services Division of McGraw-Hill Co., New York, N.Y., 1965. Pages 12, 41, 42, 64, 65. TP 684.T3 P8

Eastman Cellulose Acetate Butyrate for Protective Coatings, 2nd Edition, Kingsport, Tennessee, Eastman Chemical Products, Inc., 1962, Bulletin No. E-101, pp. 57, 63, 69

Doolittle, The Technology of Solvents and Plasticizers, Wiley, N.Y., 1954, p. 962 TP 247.5 D66.4

*Primary Examiner*—Alfred L. Leavitt
*Assistant Examiner*—Thomas E. Bokan
*Attorney*—Charles L. Good and John F. Stevens

[57] ABSTRACT

A pictorial parallax panoramagram comprising a lineiform image layer, a lenticular screen formed from a cellulose ester hot melt thermoplastic composition, said screen having a base face and a lenticulated forward face, there being a transparent layer of a primer composition between said image layer and said lenticulated screen base face, said image layer being in alignment with said lenticulated forward face, and said transparent layer comprising at least about 55 percent by weight of a tall oil fatty acid alkyd varnish.

12 Claims, No Drawings

PICTORIAL PARALLAX PANORAMAGRAM INCLUDING A CELLULOSE ESTER HOT MELT THERMOPLASTIC VIEWING SCREEN

This invention concerns pictorial parallax panoramagrams of the type intended to give either a three-dimensional or changeable picture effect. More particularly, the invention relates to a novel combination including cellulose ester hot melt thermoplastic compositions used with various picture image formations that will create such effects. This, of course, further necessitates that the hot melt thermoplastic composition be either embossed with a lenticular or other lenslike pattern or printed with a grid-type grating.

As is well known, pictorial parallax panoramagrams, i.e., "Stereograms," or "3-D pictures or units," generally are comprised of a lineated (lineiform) image layer having a lineated (lenticular or similar lenslike) optical viewing screen disposed over and in register with the image layer. Regardless of the type of image layer and the manner in which it is made, the completed parallax panoramagram, to function properly, includes either an optical or printed viewing screen. This viewing screen, as indicated, may be of the type comprising alternate opaque and transparent sections, a grid arrangement; or it may be of the type incorporating a plurality of adjacent and transparent lenticular or lenslike elements, an optical arrangement.

Parallax panoramagrams, as are described, may take a variety of forms and be manufactured in several different ways. The present invention is directed to the parallax panoramagrams which include a substrate upon which is printed a lineiform image layer and upon which there is coated a cellulose ester hot melt thermoplastic composition having a lenticulated forward face. The preferred panoramagram construction, therefore, consists essentially of a paper stock substrate with which there is associated the base (even) face of a hot melt thermoplastic composition forming the optical viewing screen. As would be expected, the various physical properties exhibited by hot melt thermoplastic compositions are important when such are to be employed in the manufacture of these parallax panoramagrams. The transparency of the thermoplastic composition is, of course, one of the more important features to be considered if good optical properties are desired. This, in turn, requires that the surface areas of the thermoplastic be free from scratches, resistant to abrasions, and as smooth as possible. Thus, it is of particular importance that the hot melt thermoplastic composition intended to produce a three-dimensional effect be able to hold a smooth lenticular or lenslike pattern. Another property desired in the hot melt thermoplastic composition is good adhesion characteristics. Unfortunately, cellulose ester hot melt thermoplastic compositions have manifested considerably less than satisfactory adhesion in the printed areas, i.e., the lineated images, of the image layer of the parallax panoramagram. A variety of primers or adhesives have been tried, but, heretofore, none have been entirely satisfactory, either failing to provide the desired adhesion or adversely affecting other desirable characteristics of parallax panoramagrams such as clarity, minimal shrinkage during curing, resistance to cracking, ability to withstand folding, toughness and flexibility, etc.

A pictorial parallax panoramagram has now been found which exhibits excellent adhesion between the printed areas of the lineiform image layer and the lenticular image screen without unduly adversely affecting other desirable characteristics. This parallax panoramagram comprises a lineiform image layer, a lenticular screen formed from a cellulose ester hot melt thermoplastic composition, said screen having a base or bottom face and a lenticulated forward or upper face, a transparent layer of a primer composition between said image layer and said lenticulated screen base face, said image layer being in alignment with said lenticulated forward face and said transparent adhesive composition comprising at least about 55 percent by weight of tall oil fatty acid alkyd varnish.

The improvements provided pictorial parallax panoramagrams by use of the tall oil fatty acid alkyd varnish as the primer composition is particularly surprising since not only have other popular adhesive primers failed but alkyd varnishes of other fatty acids or fatty acid mixtures such as tung oil fatty acids, linseed oil fatty acids, stearic acid and the like similarly have failed to exhibit satisfactory results.

The polyhydric alcohols that are normally employed in the production of alkyd varnish of the invention may be any one or more of a number of polyhydric alcohols having three to 40 carbon atoms and three to six or more hydroxyl radicals. It is normally necessary that at least three hydroxyl groups are present in the polyhydric alcohol, however, some dihydric alcohol may be present in a minor proportion. Suitable polyhydric alcohols which can be employed are trihydric alcohols such as glycerol, trimethylolethane, trimethylolpropane, trimethylolbutane, hexanetriol and butanetriol; pentaerythritol, polypentaerythritol including dipentaerythritol and tripentaerythritol, diglycerol, tetramethylol cyclohexanol, sorbitol, mannitol, inositol, trimethylolphenyl methane, trihydroxymethyl-aminomethane, etc., especially useful alkyd resins result from the employment of glycerol or pentaerythritol as the main polyhydric alcohol constituent.

The polybasic carboxylic acid employed in the production of the alkyd resin can be any of a number of polybasic acids having four to 40 carbon atoms and two to four carboxy radicals, preferably a dibasic carboxylic acid or mixture of dibasic carboxylic acids. The aromatic dicarboxylic acids such as the phthalic acids are especially useful acids for the production of alkyd resins for the present invention. Isophthalic acid generally gives especially advantageous products.

The third requisite component of the alkyd resin is tall oil fatty acids. Generally speaking, a typical crude tall oil is considered to be a mixture of fatty acids, rosin acids, and unsaponifiable materials. Normally, a crude tall oil contains about 35 percent to 50 percent by weight rosin acids, about 40 percent to 50 percent by weight fatty acids, and about 5 percent to 10 percent by weight of sterols and other unsaponifiables Of the fatty acid fraction the saturated acids normally comprise about 6 percent to 8 percent by weight, oleic acid normally comprises about 40 percent to 52 percent by weight and linoleic acid about 32 percent to 50 percent by weight. The tall oil fatty acids component is generally obtained by distillation of crude tall oil or by acid refining, and may have a rosin content from about 0.5 percent to about 40 percent depending upon the degree of distillation. The alkyd varnishes used as the primer layer in the instant invention are preferably the alkyd varnishes in which the tall oil fatty acid fraction constituent contains about 20 percent to 30 percent of rosin acid.

The proportions of the components employed to prepare the tall oil fatty acid alkyd resin employed according to the invention are well known in the art. See, for example "Tall Oil and Its Uses" by Information Training Services Division of McGraw-Hill Co., New York, N.Y. (1965). Particular reference is invited to pages 41–46 as well as other parts of this publication. In general, the total of the acid components employed may be that which completely esterifies the polyhydric component but preferably a slight excess of the polyhydric component is employed. In other words, the equivalents of polyhydric alcohol used are about equal to or in slight excess (usually up to about 1.1:1) equivalents of the mixture of tall oil fatty acid and dibasic acid components. By "equivalent" is meant the number of moles of a substance times the number of functional groups, e.g., hydroxyl or carboxyl groups, present in its structure. The molar proportions of the tall oil acid components to the dibasic acid components usually falls in the range of about 2 to about 4:1, preferably from about 2.5 to about 3.0:1. Suppliers of the various materials used throughout this specification are well known to those working in this art. Tall oil alkyd resins, varnishes, related derivatives and the like are well known in the art as already indicated by having particular attention directed to "Tall Oil and Its Uses." Other well-known publications also are readily available with respect to other aspects of this invention.

If desired, the tall oil fatty acid alkyd varnish of the invention may be modified by the addition of other alkyd resins, oils and/or other additives commonly incorporated in varnishes, as long as they are employed in concentrations that do not adversely affect the adhesive advantages provided by the tall oil fatty acid varnish. It is especially advantageous, for instance, to add a rosin-modified phenolic resin usually in an amount of up to about 8 percent by weight. Other additives commonly added to alkyd varnishes are viscosity thickeners, driers, pigments and the like. Pigment concentrations, when employed, usually fall in the range of about 10 percent to 35 percent by weight while driers when employed are generally present in concentrations of up to about 10 percent by weight, preferably about 1 to 7 percent by weight.

It should be emphasized that when the aforementioned optional constituents are employed together with tall oil fatty acid varnish, the latter should be present in an amount of at least about 55 percent by weight of the total composition. Use of a primer composition wherein the quantity of tall oil fatty acid alkyd varnish falls below about 55 percent by weight fails to provide the improved adhesion. Preferably, the tall oil fatty acid alkyd resin should be present in a concentration of at least about 75 percent by weight of the primer composition.

The primer composition of the invention is applied to at least the printed areas of the lineiform image layer by any convenient method as, for instance, by brushing, spraying, and like means well known in the art. The thickness of the primer layer may vary but should be sufficient to effect the desired adhesion. Ordinarily, a primer layer thickness of about three units on the Gardner Ink Thickness gauge is sufficient.

The hot melt thermoplastic materials employed to form the lenticular image screen of the parallax panoramagrams include any of the thermoplastic, cellulose ester, hot melt coating compositions. The preferred cellulose ester compositions consist essentially of between about 65 percent and 85 percent by weight of cellulose acetate butyrate, cellulose acetate propionate, or cellulose propionate butyrate, and between about 15 percent and 35 percent by weight of a compatible plasticizer for these cellulose esters. The proportions of each are such that when the composition is in hot melt form, the melt viscosity is between about 2,000 and about 50,000 centipoises, the preferred being between about 20,000 and about 35,000 centipoises at 374° F. and has a melt stability of about 1 to 1.6 hours. The melt stability is the time that the molten composition can be maintained without experiencing any substantial degradation at the extrusion conditions of at least 350° C. and 100 p.s.i.g.

The especially preferred cellulose ester composition, however, includes among other things, cellulose acetate butyrate and di(2-ethylhexyl) adipate. This composition forms a surprisingly smooth surface even after lenslike areas are embossed thereon and shows marked improvement in clarity and resistance to stress cracking. It additionally exhibits coefficient of expansion and elasticity characteristics such that the curling of coated paper substrates is substantially reduced.

The cellulose ester hot melt composition may be coated or applied to the substrate having a lineiform printed image layer by employing any of the various techniques well known in the art. A preferred method comprises extruding the hot melt composition in the form of a plurality of beadlike formations and depositing those formations onto the substrate having the lineiform printed image layer. The beadlike formations are thereafter spread and the forward face thereof is embossed with a lenticular surface pattern. The composition coated substrate is then cooled and removed from the coating apparatus. The usual range of operating conditions that may be experienced in the manufacture of such typical pictorial parallax panoramagrams are about 250° to 450° F. at 400 to 1,400 p.s.i.g.

As is stated above, the principal component of the preferred hot melt thermoplastic composition of this invention is cellulose acetate butyrate. This material is well known and is prepared by known procedures involving the esterification of cellulose by selected acidic materials. This cellulosic should contain not more than about 2 percent by weight of free hydroxyl, have a viscosity of about 0.5 to 30 seconds.

Unplasticized hot melt thermoplastic compositions have melt viscosities that are too high for most commercial extrusion processes. Thus, a plasticizer should be employed to dissolve the cellulose ester and reduce the melt viscosity as the composition is heated. When the hot, molten composition is extruded, the viscosity increases due to at least two effects; namely, the cooling of the resin and the loss of plasticizer by evaporation from the hot extrudate. Therefore, regulation of the various operating conditions of the coating process enable use of compositions having the wide range of melt viscosities as mentioned above.

The plasticizer which may be included as a part of the thermoplastic composition may be selected from any one of the many materials that are compatible with the particular cellulose ester being employed. In general, however, the plasticizer should have (1) a boiling point of at least 325° C. (617° F.), preferably higher than 350° C. (662° F.) at atmospheric pressure, (2) a flash point of at least 370° F. (measured by the Cleveland Open Cup method, ASTM DO2-52) and (3) substantially no offensive odor. Several such suitable plasticizers include, trialkyl esters of acyl citric acid, such as acetyl tributyl citrate and acetyl triethyl citrate; dialkyl phthalates, such as di(2-ethylhexyl) phthalates, butyloctylphthalate, diisodecylphthalate, di(2-ethylhexyl) hexahydrophthalate, and diiso-octylphthalate; dibasic acid esters, such as di(2-ethylhexyl) adipate, diisodecyl adipate, dibutyl sebacate, and dioctyl sebacate; aryl phosphates, such as tricresyl phosphate and triphenyl phosphate; and acetylated monoglycerides. Of these, di(2-ethylhexyl) adipate has been found to be very satisfactory.

The amount of plasticizer which should be employed for each composition will vary to some extent with the type of plasticizer employed and with the particular cellulose ester resin which is being plasticized. In general, the amount of plasticizer in the final composition may vary from about 10 percent to about 59 percent by weight. The amount of plasticizer employed with cellulose acetate butyrate will normally vary from about 15 percent to about 35 percent by weight of the total composition with the preferred concentration being between about 20 percent and 30 percent. The plasticizer concentration appears to have a significant effect upon curl. Although the reasons for this are not fully understood, it is theorized that variations in the amount of plasticizer effects the coefficient of expansion and elasticity of the hot melt thermoplastic composition such that the tendency to curl is reduced.

Stabilizers may be added to the thermoplastic composition to provide protection against degradation due to heat, oxidation and the presence of foreign substances. The stabilizers are those well known in the art and include materials such as acid acceptors, antioxidants, buffering agents and the like. Specific substances which have been found useful in this regard are the epoxides, such as epoxidized soybean oil, and phenolic antioxidants. The amount of stabilizer which is employed in the composition is small and normally does not exceed about 0.1 to 3 percent by weight of the cellulose ester resin present in the composition.

Coloring dyes are frequently employed in order to provide the thermoplastic composition with the desired tint. The most common reason for incorporating a dye in the composition is to provide optimum clarity. Ultramarine Blue which occurs naturally as Lapis Lazuli is particularly effective but other dyes may be incorporated to provide any desired color or tint. These include a wide variety of azo dyes or anthraquinone dyes. The concentration of such dyes, in general, is less than about 700 parts per million, based on the weight of the total composition. Properly employed, these then may substantially assist in improving the clarity and the optical properties of the composition.

In certain embodiments of this invention, extender resins or fillers may be employed to reduce the cost of the hot melt coating composition even further. Materials which have been found useful for this purpose are polymers of alpha-methylstyrene, sucrose acetate isobutyrate and the like. These extender resins may be employed in amounts up to about 20 percent by weight of the total composition.

As has been noted, the substrate material will carry a printed lineiform image layer. Such an image layer normally is a color reproduction (i.e., bland and white or other) formed by a plurality of printing ink compositions. Although the primer of the invention may be employed regardless of the type and composition of the ink forming the image layer, it is preferred, as another embodiment of the invention to employ printing ink compositions, the vehicle of which is the tall oil fatty acid alkyd varnish of the invention. These printing ink compositions comprise about 55 to 90 percent by weight of the tall oil fatty acid alkyd varnish and about 10 to 45 percent by weight, preferably about 10 to 35 percent by weight, of pigment. The tall oil fatty acid alkyd varnish vehicle of the printing ink composition may optionally include a lithographic grinding varnish, a drying agent and/or other well-known constituents of printing inks. The lithographic grinding varnish compound is a composition well known and frequently used in lithographic inks. Normally, the material primarily comprises thickened linseed oil, optionally modified with other resins. When the lithographic grinding varnish compound is used in the printing ink composition, it is normally employed in quantities of up to about 20 percent by weight. Suitable driers which may be included in the printing ink composition have been discussed above with reference to the primer composition of the invention and normally are present in a concentration of up to about 10 percent by weight, preferably about 1 to 7 percent by weight. The pigments suitable for the present invention can be readily selected from a vast number of known pigments which are compatible with tall oil fatty alkyd varnish. Substantially all of the known pigments are believed to be useful.

The ink compositions may be simply prepared by charging the components in a reactor, heated to about 200° to 300° C. and held there for several hours. If desired, the resulting composition may be then combined with modifying resins, for example, a resin-modified phenolic resin.

The following examples are included for a better understanding of the invention. Parts and percentages are by weight unless otherwise specified. EXample I Preparation of Primer Composition: 2,860 parts by weight of a tall oil fatty acid (containing about 24 percent rosin), 525.2 parts by weight glycerine, and 577.2 parts by weight isophthalic acid are charged into a reactor and heated to 230° to 240° C. and held at that temperature until the acid number of the resultant product is equal to about 22 to 25. At the end of that time, i.e., from 6 to 12 hours depending upon the size of the cook, 197.4 parts by weight of a rosin-modified phenolic resin having a m.p. of 145° to 153° C. and acid no. of 12 to 18 is added. After solution of resin, the varnish is allowed to cool to ambient temperature. To 84 parts by weight of this varnish is dispersed 1 part by weight manganese drier (6 percent mn.), 3 parts by weight of cobalt drier (6 percent Co) and 12 parts by weight Santocel C, a flatting grade silica viscosity thickener. Example II A hot melt thermoplastic coating composition comprised essentially of the following constituents is prepared:

| Cellulose acetate butyrate | 71.5% |
| Di(2-ethylhexyl) adipate | 28.5% |
| Stabilizer | 0.3 parts per hundred of cellulosic |
| Coloring Pigment | 0.005 parts per hundred of cellulosic |

The plurality of ink printed images lineiform in nature provided with a suitable substrate, such as a sheet or web paper stock material, are coated with the alkyd varnish primer composition of Example I and the thus-coated substrate fed to and coated by a hot melt coater. The coater deposits a beadlike formation upon the adhesive-containing substrate and this hot melt thermoplastic deposition is thereafter embossed with a lenslike pattern that is approximately 10 mils thick and is accurately aligned with the image layer. The thermoplastic is allowed to cure and the coated stock is removed from the apparatus. The resulting pictorial parallax panoramagram is of excellent quality.

The adhesion of the lenticulated thermoplastic layer to the lineiform image layer is tested by subjecting a 1-inch strip of the panoramagram to a peel test comprising peeling the two layers apart at 180° and measuring the pounds of force on an Instron testing machine. A peel test result of approximately 2 lb./in. is obtained. (A peel test result in excess of approximately 1.5 lb./in. is usually required for a satisfactory product). For purposes of comparison, a parallax panoramagram, made by the same procedure using the same components but without coating the image layer with the alkyd varnish of Example I, is subjected to the same peel test. The test results obtained are approximately 0.2 lb./in. Example III The procedure described in Example II is again repeated except that the hot melt thermoplastic coating composition is as follows:

| Cellulose acetate butyrate | 80% |
| Di(2-ethylhexyl) adipate | 20% |
| Stabilizer | 0.2 parts per hundred of cellulosic |
| Coloring Pigment | 0.005 parts per hundred of cellulosic |

The resulting panoramagram when subjected to the peel test described in Example II exhibits a peel strength in excess of 1.5 lb./in. Example IV The procedure described in Example II is again repeated except that the hot melt thermoplastic coating composition is as follows:

| Cellulose acetate butyrate | 77% |
| Di(2-ethylhexyl) adipate | 23% |
| Stabilizer | 0.3 parts per hundred of cellulosic |
| Coloring Pigment | 0.005 parts per hundred of cellulosic |

The resulting panoramagram when subjected to the peel test described in Example II exhibits a peel strength in excess of 1.5 lb./in. Example V The procedure described in Example II is repeated and each thermoplastic composition as are described in Example II–IV are employed separately to produce panoramagrams having substantially uniform thicknesses approximately 18 mils and 30 mils.

Each of the resulting panoramagrams when subjected to the peel test described in Example II exhibits a peel strength in excess of 1.5 lb./in.

Although the invention has been described in considerable detail with reference to certain preferred embodiments thereof, it will be understood that variations and modifications can be effected within the spirit and scope of the invention.

I claim:

1. A pictorial parallax panoramagram comprising a substrate having a lineiform image layer, a lenticular screen formed from a cellulose ester hot melt thermoplastic composition, said screen having a base face and a lenticulated forward face, a transparent layer of a primer composition between said image layer and said lenticulated screen base face, said image layer being in alignment with said lenticulated forward face and said transparent primer composition comprising at least about 55 percent by weight of a tall oil fatty acid alkyd varnish.

2. The pictorial parallax panoramagram of claim 1 wherein the cellulose ester hot melt thermoplastic composition comprises:

1. A cellulose ester selected from the group consisting of cellulose acetate butyrate, cellulose acetate propionate and cellulose propionate butyrate;
2. a compatible plasticizer for said cellulose ester having a boiling point of at least about 325° C.; and
3. a compatible stabilizer for said cellulose ester, the proportions of each being such that the composition has a melt viscosity of between about 20,000 and about 35,000 centipoises at 374° F.

3. The pictorial parallax panoramagram of claim 2 wherein said hot melt thermoplastic composition also includes a coloring agent or a suitable dye selected from the group comprising azo and anthraquinone dyes.

4. The pictorial parallax panoramagram of claim 2 wherein said composition consists essentially of 65 percent to 85 percent by weight of said cellulose ester and 15 percent to 35 percent of said plasticizer.

5. The pictorial parallax panoramagram of claim 2 wherein said plasticizer is selected from the group consisting of the dialkyl phthalates and the dibasic acid esters.

6. The pictorial parallax panoramagram of claim 1 wherein the cellulose ester hot melt thermoplastic composition comprises about:
1. 70 percent to 80 percent by weight of cellulose acetate butyrate;
2. 20 percent to 30 percent by weight of di(2-ethylhexyl) adipate; and
3. a compatible stabilizer for said cellulose acetate butyrate.

7. The pictorial parallax panoramagram of claim 1 wherein between about 20 to 30 percent by weight of the tall oil fatty acid constituent of the alkyd varnish comprises rosin acids.

8. The pictorial parallax panoramagram of claim 1 wherein the primer composition includes up to 8 percent by weight of rosin-modified phenolic resin.

9. The pictorial parallax panoramagram of claim 1 wherein the primer composition comprises at least 75 percent by weight of the tall oil fatty acid alkyd varnish.

10. The pictorial parallax panoramagram of claim 1 wherein the polyhydroxyl component of the alkyd varnish consists essentially of a trihydric alcohol and the polybasic component of the alkyd varnish consists essentially of an aromatic dicarboxylic acid.

11. The pictorial parallax panoramagram of claim 10 wherein the trihydric alcohol is glycerine and the aromatic dicarboxylic acid is isophthalic acid.

12. In the preparation of pictorial parallax panoramagrams by coating a printable substrate having a lineiform image layer with a cellulose ester hot melt thermoplastic composition subsequently embossed to provide a lenticular screen having a base face and a lenticulated forward face in alignment with said lineiform image layer, the improvement which comprises applying to the lineiform image layer prior to said coating a primer composition comprising at least about 55 percent by weight of a tall oil fatty acid alkyd varnish.

* * * * *